US007907139B2

(12) United States Patent
Hao et al.

(10) Patent No.: US 7,907,139 B2
(45) Date of Patent: Mar. 15, 2011

(54) METHOD FOR PLACEMENT OF DATA FOR VISUALIZATION OF MULTIDIMENSIONAL DATA SETS USING MULTIPLE PIXEL BAR CHARTS

(75) Inventors: Ming C. Hao, Palo Alto, CA (US); Umeshwar Dayal, Saratoga, CA (US); Meichun Hsu, Los Altos Hills, CA (US); Daniel A. Keim, Morris Plains, NJ (US); Adrian Krug, Duesseldorf (DE); Julian Ladisch, Halle (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1505 days.

(21) Appl. No.: 09/982,481

(22) Filed: Oct. 17, 2001

(65) Prior Publication Data

US 2003/0071815 A1 Apr. 17, 2003

(51) Int. Cl.
*G09G 5/00* (2006.01)
*G06T 11/20* (2006.01)

(52) U.S. Cl. ............... 345/440; 345/440.2; 345/441; 345/442; 345/619; 715/700; 715/788

(58) Field of Classification Search .......... 345/440, 345/440.1, 440.2, 441, 442, 619; 715/700, 715/788

See application file for complete search history.

(56) References Cited

U.S. PATENT DOCUMENTS

| | | | |
|---|---|---|---|
| 5,801,688 A * | 9/1998 | Mead et al. ............ 715/700 |
| 5,929,863 A * | 7/1999 | Tabei et al. ............ 345/440 |
| 5,986,673 A * | 11/1999 | Martz ............ 345/649 |
| 6,269,325 B1 * | 7/2001 | Lee et al. ............ 703/2 |
| 6,400,366 B1 * | 6/2002 | Davies et al. ............ 345/440 |
| 6,748,496 B1 | 6/2004 | Scarpino |
| 6,762,791 B1 | 7/2004 | Schuetzle |
| 6,819,441 B2 | 11/2004 | Umebayashi |
| 7,221,474 B2 * | 5/2007 | Hao et al. ............ 358/1.18 |
| 2001/0027791 A1 | 10/2001 | Wallace et al. |
| 2002/0111791 A1 | 8/2002 | Candelore |
| 2003/0004971 A1 | 1/2003 | Gong et al. |
| 2004/0205450 A1 | 10/2004 | Hao et al. |

OTHER PUBLICATIONS

D. Keim, M. C. Hao, J. Ladisch, M. Hsu, U. Dayal, "Pixel Bar Charts: A New Technique for Visualizing Large Multi-Attribute Data Sets without Aggregation", HP Technical Report, Apr. 11, 2001, pp. 1-10.*

M. Ankerst, M. Ester, H.-P. Kriegel, "Towards an effective cooperation of the computer and the user for classification", Proc. 6th Int. Conf. On Knowledge Discovery and Data Mining, (KDD '2000), Aug. 20-23, 2000, Boston, MA, 2000, pp. 1-10.*

(Continued)

*Primary Examiner* — Jin-Cheng Wang

(57) ABSTRACT

A method for effective placement of data for visualization of multidimensional data sets using multiple pixel bar charts. Data is received comprising a plurality of records, each record having a plurality of attributes. From the plurality of attributes, a set of attributes is determined for placement of the plurality of records in a graphically displayable array comprising a plurality of data points, each data point representing one record of the plurality of records. In one embodiment, the graphically displayable array is a pixel bar chart. The plurality of records are arranged to construct the pixel bar chart for presenting the data in a format for detecting relationships between the plurality of records. The present invention provides a pixel visualization technique having a method of optimal data placement to resolve the locality and ordering constraints.

39 Claims, 7 Drawing Sheets

OTHER PUBLICATIONS

M.C. Hao, J. Ladisch, U. Dayal, M. Hsu, A. Krug; "Visual Mining of E-customer Behavior Using Pixel Bar Charts", HP Technical Report, Jun. 20, 2001, pp. 1-7.*

B. Shneiderman, "Tree Visualization with Treemaps: a 2-D Space-Filling Approach", ACM Transactions on Graphics, vol. 11, No. 1, pp. 92-99.*

D. A. Keim, "Designing Pixel-oriented Visualization Techniques: Theory and Applications", IEEE Transactions on Visualization and Computer Graphics, vol. 6, No. 1, Jan.-Mar. 2000, pp. 1-20.*

M. Sifer, "Query Web Site Visitor Trend Data with Coordinated Nested Bar and Pie Charts", Proc. of the Pan-Sydney area Workshop on Visual Info. Proc., May 2001, Sydney, Australia, pp. 1-2.*

* cited by examiner

400

Start

410
Determine the one-dimensional histograms for the first ordering attribute and the second ordering attribute

420
Place the pixel in the lower-left corner of the sub-group

430
Place all pixels in the lower pixel row and the left pixel row of the sub-group

440
Iteratively place all remaining pixels from the lower-left of the sub-group to the upper-right of the sub-group End

Figure 4

METHOD FOR PLACEMENT OF DATA FOR VISUALIZATION OF MULTIDIMENSIONAL DATA SETS USING MULTIPLE PIXEL BAR CHARTS

FIELD OF INVENTION

The present invention relates to the field of information visualization. Specifically, the present invention relates to a method for placement of data for visualization of multidimensional data sets using multiple pixel bar charts.

BACKGROUND OF THE INVENTION

Pixel-oriented techniques allow for the presentation of large amounts of data having detailed information. To date, many visualization applications utilize pixel-oriented techniques, such as the spiral technique, the recursive pattern technique and the pixel bar chart technique. The pixel bar chart technique is for presenting the data values directly rather than aggregating the data into a few data values. The approach is to represent each item by a single pixel in the bar chart.

However, for an analysis of large volumes of data (e.g., large volumes of e-commerce transactions), the visualization of complex data is not sufficient. In order to optimally view and interpret the data it is necessary to optimally place the data. It is not obvious what an optimal placement of pixel should be. The optimal placement of data associated with visualization of massive multi-attribute data presents particular problems.

For one, in large data sets (e.g., dense data sets), limitations exist on pixel visualizations that are capable of showing large amounts of data on a value by value basis without aggregation. Current techniques do not offer optimal arrangement of data for detecting close relationships among the data. Also, current techniques do not offer an optimal arrangement of data for representing multiple attributes.

Current pixel visualization techniques also do not present data such that similar data records are placed close to each other. It is desirable to place similar records close to each other to fully appreciate the information presented by the data. For example, the detection of trends among data requires that similar records be placed in close proximity.

Furthermore, current pixel visualization techniques do not arrange data in a logical sequence. Current techniques provide insufficient placement to resolve the locality and ordering constraints. As such, data is not categorized, and is more difficult to understand.

Also, limitations exist such that current pixel visualization techniques are restricted with respect to the number of the data attributes that may be used. Current techniques are typically limited to either four or six attributes. Since it is not uncommon to have data sets comprised of greater than 10 attributes, this limitation can severely restrict optimal viewing and interpretation of the data.

Accordingly, a need exists for a method for optimal placement of data associated with visualization of massive multi-attribute data in pixel bar charts. A need also exists for a method for presenting an overview of the data while also presenting the detailed information for each data item. A need also exists for a method for presenting data in a manner for detecting close relationships and trends among the data. A need also exists for a pixel visualization technique that presents data in a categorized manner that is easy to understand.

SUMMARY OF THE INVENTION

A method for placement of data for visualization of multidimensional data sets using multiple pixel bar charts is presented. Data is received comprising a plurality of records, each record having a plurality of attributes. From the plurality of attributes, a set of attributes is determined for placement of the plurality of records in a graphically displayable array comprising a plurality of data points, each data point representing one record of the plurality of records. In one embodiment, the graphically displayable array is a pixel bar chart. The plurality of records are arranged to construct the pixel bar chart for presenting the data in a format for detecting relationships between the plurality of records. The present invention provides a pixel visualization technique having a method of optimal data placement.

In one embodiment, the plurality of records are sorted by a first dividing attribute corresponding to horizontal axis, and partitioned into groups according to the first dividing attribute. In one embodiment, the plurality of records are then sorted by a second dividing attribute corresponding to vertical axis, and partitioned into sub-groups according to the second dividing attribute. The records of each of sub-group are then sorted according to a first ordering attribute and a second ordering attribute. A visual indicator (e.g., a color) is then applied to each record according to a visual Indicator attribute.

The present invention provides a method of efficient pixel placement for producing dense pixel visualizations that are capable of showing large volumes of multi-dimensional data sets and provides a heuristic placement method to resolve locality and ordering constraints. The present invention allows for the partition of the data set according to the x-axis and y-axis for placement of pixels of each partition in the corresponding regions according to the x- and y-ordering. As such, the present invention provides a method for generating a pixel bar chart for detecting close relationships and trends among the data that is categorized and easy to understand.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart diagram illustrating steps in a process for pixel placement within a sub-group of a pixel bar chart in accordance with an embodiment of the present invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

Portions of the present invention are comprised of computer-readable and computer executable instructions which reside, for example, in computer-usable media of a computer system. It is appreciated that the present invention can operate within a number of different computer systems including general purpose computer systems, embedded computer systems, and stand alone computer systems specially adapted for controlling automatic test equipment.

Figure 1:
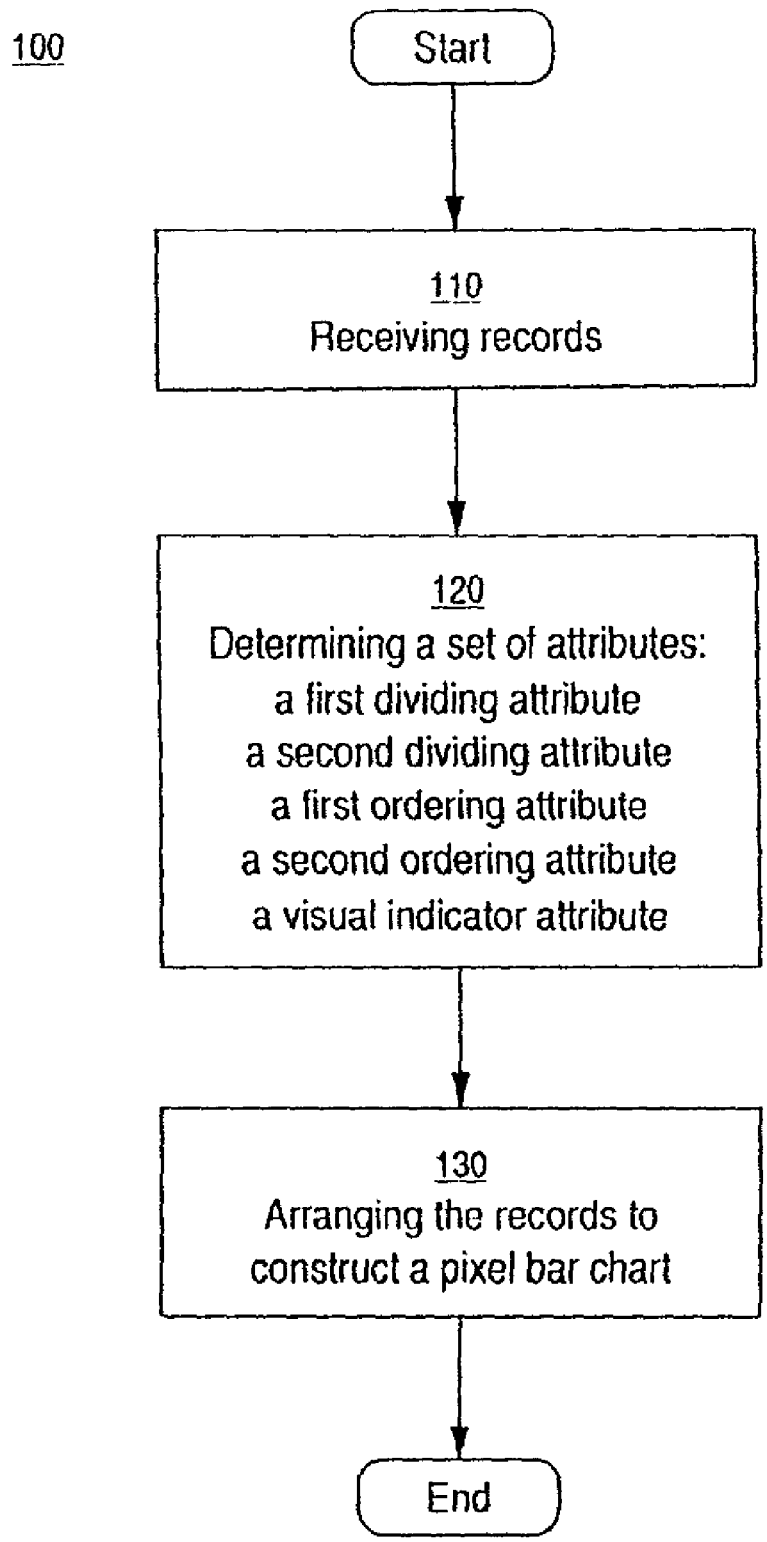
FIG. 1 is a flowchart diagram illustrating steps in a process for generating a pixel bar chart in accordance with an embodiment of the present invention.

FIG. 1 is a flowchart diagram illustrating steps in a process 100 for generating a pixel bar chart in accordance with an embodiment of the present invention. Steps of process 100, in the present embodiment, may be implemented with any computer languages used by those of ordinary skill in the art. In one embodiment, process 100 is for graphically presenting and visually mining large volumes of data using a graphically displayable array.

In one embodiment, the graphically displayable array is a pixel bar chart. In one embodiment, each record is represented by one unique pixel of a display. In another embodiment, each record is represented by a data point of a display, wherein the data point comprises a plurality of pixels.

At step 110 of process 100, data comprising a plurality of records is received. Each record comprises a plurality of attributes, wherein each attribute corresponds to a particular item of information of the record. For example, a consumer electronics business has a record for each order the business handles. In this example, each record may have attributes corresponding to the order number, the price of the order, the customer identification number (ID), and the quantity of items ordered, as well as other attributes corresponding to customer data. It should be appreciated that each attribute of each record represents a value of the represented data item. As such, references to an attribute (e.g., first dividing attribute) with respect to a record are intended to refer to the corresponding value for that attribute of the record.

At step 120, a set of attributes is determined from the plurality of attributes, wherein the set of attributes is for placement of the plurality of records in the graphically displayable array. In one embodiment, a first dividing attribute, a second dividing attribute, a first ordering attribute, a second ordering attribute and a visual indicator attribute are selected.

In one embodiment, the first dividing attribute corresponds to a horizontal axis and the second dividing attribute corresponds to a vertical axis of the graphically displayable array. The first dividing attribute and second dividing attribute are for partitioning the data into groups and sub-groups. It should be appreciated that the first dividing attribute and the second dividing attribute are distinct attributes selected from the plurality of attributes. However, each of the first dividing attribute and the second dividing attribute may be the same as the first ordering attribute, the second ordering attribute and the visual indicator attribute.

In one embodiment, the first ordering attribute corresponds to a horizontal axis and the second ordering attribute corresponds to a vertical axis of the graphically displayable array. The first ordering attribute and second ordering attribute are for placing the individual records within each of the groups and sub-groups. It should be appreciated that the first ordering attribute and the second ordering attribute are distinct attributes selected from the plurality of attributes. However, each of the first ordering attribute and the second ordering attribute may be the same as the first dividing attribute, the second dividing attribute and the visual indicator attribute.

In one embodiment, the visual indicator attribute corresponds to a visual indicator. In one embodiment, the visual indicator is a color for pixel coloring. It should be appreciated that the visual indicator attribute is selected from the entire plurality of attributes. As such, the visual indicator attribute may be the same as any of the other selected attributes.

At step 130 of process 100, the plurality of records are arranged to construct the graphically displayable array for presenting said data in a format for detecting relationships between the plurality of records. In one embodiment, the present invention provides a process for placement of data for visualization of multidimensional data sets using multiple pixel bar charts in accordance with an embodiment of the present, as described in process 200 of FIG. 2.

The present invention provides a method of efficient pixel placement for producing dense pixel visualizations that are capable of showing large volumes of data sets and provides a heuristic placement method to resolve locality and ordering constraints. The present invention allows for the partition of the data set according to the x-axis and y-axis and for placement of pixels of each partition in the corresponding regions according to the x- and y-ordering. As such, the present invention provides a method for generating a pixel bar chart for detecting close relationships and trends among the data that is categorized and easy to understand.

Figure 2:
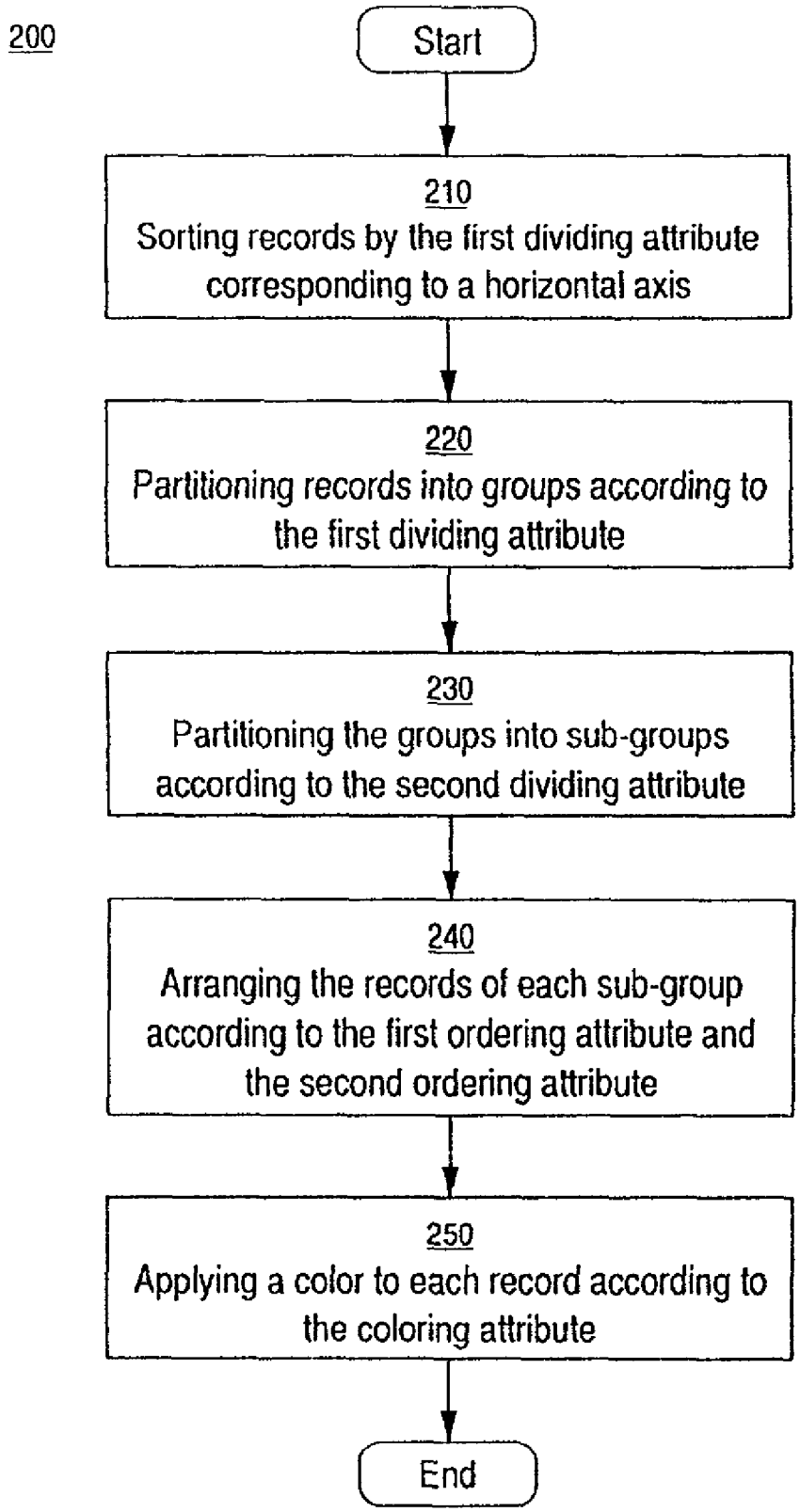
FIG. 2 is a flowchart diagram illustrating steps in a process for placement of data for visualization of multidimensional data sets using multiple pixel bar charts in accordance with an embodiment of the present invention.

FIG. 2 is a flowchart diagram illustrating steps in a process 200 for placement of data for visualization of multidimensional data sets using multiple pixel bar charts in accordance with an embodiment of the present invention. Steps of process 200, in the present embodiment, may be implemented with any computer languages used by those of ordinary skill in the art. In one embodiment, process 200 is for graphically presenting and visually mining large volumes of data using a graphically displayable array.

At step 210 of process 200, the plurality of records are sorted by the first dividing attribute. In one embodiment, the first dividing attribute is selected for partitioning the plurality of records (e.g., the data) into groups. In one embodiment, the groups correspond to a partitioning of the screen of a display according to the horizontal axis (e.g., x-axis).

At step 220, the records are partitioned into groups according to the first dividing attribute. In one embodiment, the first dividing attribute corresponds to the horizontal axis ($D_x$).

Figure 3A:
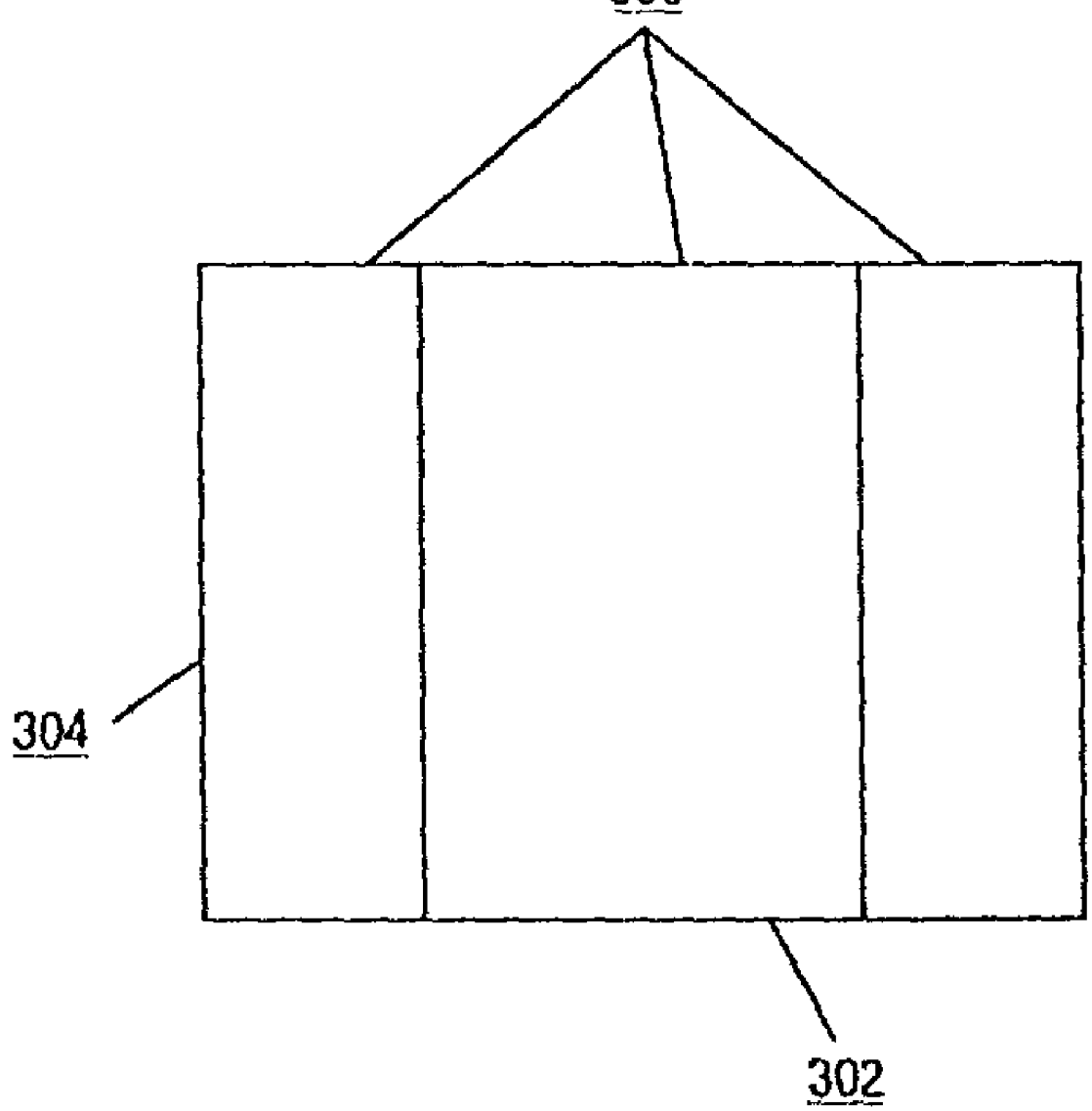
FIG. 3a is a block diagram illustrating the partitioning of records into groups accordingly in accordance with an embodiment of the present invention.

FIG. 3a is a block diagram of a graphically displayable array 300 (e.g., a pixel bar chart) as shown on a display illustrating the partitioning of records into groups 306 accordingly in accordance with an embodiment of the present invention.

Graphically displayable array 300 has horizontal axis (e.g., x-axis) 302 and vertical axis (e.g., y-axis) 304 and comprises a plurality of data points (e.g., pixels). The records are sorted by the first dividing attribute, which corresponds to horizontal axis 302. The records are divided into groups 306 according to each record's value of the first dividing attribute.

At step 230, the records are partitioned into sub-groups according to the second dividing attribute. In one embodiment, the second dividing attribute corresponds to the vertical axis ($D_y$). It should be appreciated that in an embodiment of the present invention, no attribute is specified for the second dividing attribute.

Figure 3B:
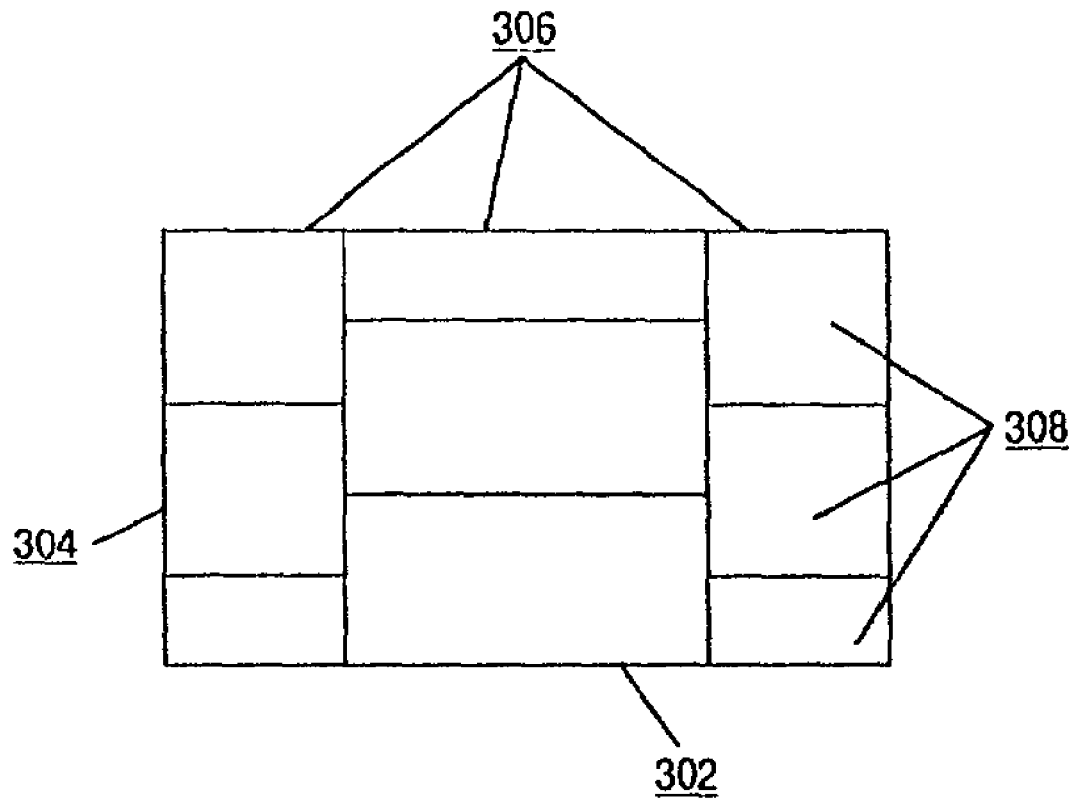
FIG. 3b is a block diagram illustrating the sorting of a plurality of records within a group by a second dividing attribute and partitioning the records into sub-groups accordingly in accordance with an embodiment of the present invention.

FIG. 3b is a block diagram of a graphically displayable array 320 (e.g., a pixel bar chart) as shown on a display illustrating the partitioning of records within a group 306 into sub-groups 308 accordingly in accordance with an embodiment of the present invention.

Graphically displayable array 320 has horizontal axis (e.g., x-axis) 302 and vertical axis (e.g., y-axis) 304 and comprises a plurality of data points (e.g., pixels). The records are divided into groups 306 according to each record's value of the first dividing attribute. Within each group 306, the records are divided into sub-groups 308 according to each record's value of the second dividing attribute.

At step 240, the records of each sub-groups (or group if no second dividing attribute is selected) are arranged and placed according to the first ordering attribute and the second ordering attribute. In one embodiment, the arrangement and placement of pixels is conducted according to a process for pixel placement within a sub-group of a pixel bar chart as described in process 400 of FIG. 4. In one embodiment, the first ordering attribute corresponds to the horizontal axis ($O_x$) and the second ordering attribute corresponds to the vertical axis ($O_y$).

Figure 3C:
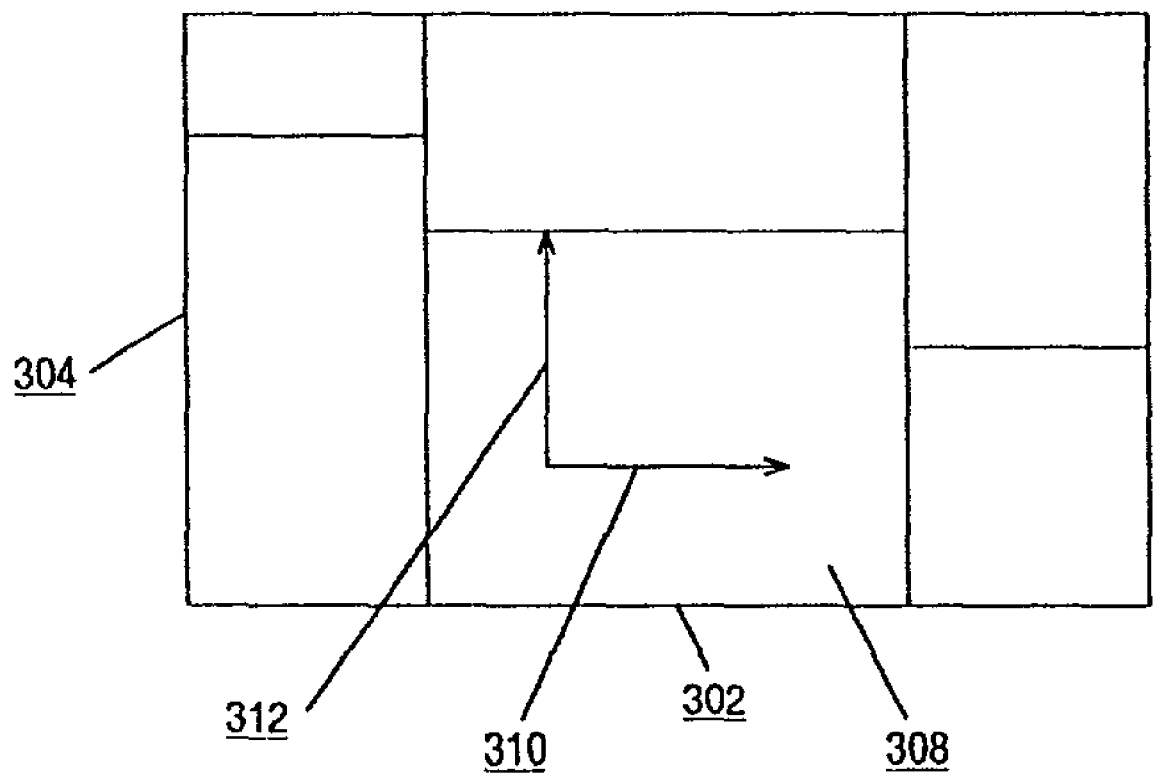
FIG. 3c is a block diagram illustrating the arranging of a plurality of records within a sub-group by a first ordering attribute and a second ordering attribute in accordance with an embodiment of the present invention.

FIG. 3c is a block diagram of graphically displayable array 340 (e.g., a pixel bar chart) as shown on a display illustrating the arranging of a plurality of records within a sub-group 308 by a first ordering attribute and a second ordering attribute in accordance with an embodiment of the present invention.

Graphically displayable array 340 has horizontal axis (e.g., x-axis) 302 and vertical axis (e.g., y-axis) 304 and comprises a plurality of data points (e.g., pixels). In one embodiment, the records are divided into groups 306 according to each record's value of the first dividing attribute (e.g., no second dividing attribute is determined). The records of each group 306 are placed according to a first ordering attribute and a second ordering attribute. Ordering arrows 310 and 312 indicate the direction of record placement within each group 306.

In another embodiment, the records are divided into sub-groups 308 according to each record's value of the first dividing attribute and value of the second dividing attribute. The records of each sub-group 308 are placed according to a first ordering attribute and a second ordering attribute. Ordering arrows 310 and 312 indicate the direction of record placement within each sub-group 308.

At step 250, a visual indicator is applied to each record according to the visual indicator attribute. In one embodiment, the visual indicator is a color. In one embodiment, non-linear 256 RGB (red-green-blue) color scale is used for determining the color for each record. In another embodiment, a non-linear gray-scale color scale is used to determine the color for each record. It should be appreciated that any color scale or range, both linear and non-linear, may be used in regard to the present invention. In one embodiment, the value of the visual indicator attribute is normalized to the range 0 to 1. In one preferred embodiment, the normalization is nonlinear. Then the range 0 to 1 is mapped to a color range.

In one embodiment, where multiple pixel bar charts are used, different attributes are the visual indicator attribute in different bar charts, which enables a user to relate the different coloring attributes and detect partial relationships among the records. In the present embodiment, the dividing and ordering attributes have to stay in the same order:

$<D_x, D_y, O_x, O_y, C>$ where $D_x, D_y, O_x, O_y, C \in \{A_1, \ldots, A_k\} \cup \perp$ and $D_x/D_y$ are the dividing attributes in x-/y-direction, $O_x/O_y$ are the ordering attributes in x-/y-direction, and C is the coloring attribute. The element $\perp$ is used if no attribute is specified.

FIG. 4 is a flowchart diagram illustrating steps in a process 400 for pixel placement within a sub-group of a pixel bar chart in accordance with an embodiment of the present invention. The pixel placement within one sub-group requires a two-dimensional sort. The present invention provides a heuristic process for pixel placement by partitioning the data set into subsets according to the first ordering attribute ($O_x$) and the second ordering attribute ($O_y$).

At step 410, the one-dimensional histograms for $O_x$ and $O_y$ are determined for providing an efficient pixel placement within a single sub-group. The one-dimensional histograms for $O_x$ and $O_y$ are used to determine the ∂-quantiles of $O_x$ and $O_y$. In one embodiment, if the sub-group under consideration has extension w×h pixels, the $1/w, \ldots, (w-1)/w$-quantiles for the partitioning of $O_x$ and the $1/h, \ldots, (h-1)/h$-quantiles for the partitioning of $O_y$ are determined. The quantiles are then used to determine the partitions $X_1, \ldots, X_w$ of $O_x$ and $Y_1, \ldots, Y_h$ of $O_y$. The partitions $X_1, \ldots, X_w$ are sorted according to $O_y$ and the partitions $Y_1, \ldots, Y_h$ according to $O_x$.

At step 420, the pixel in the lower-left corner is placed (e.g., position (1,1), of the sub-group). In one embodiment, the pixel is placed according to Equation 1

$$f^{-1}(1,1) = \left\{ d_s \;\middle|\; \min_{d_s \in X_1}\{d_s \cdot a_2\} = \min_{d_s \in Y_1}\{d_s \cdot a_1\} \right\} \quad \text{Equation 1}$$

At step 430, all pixels in the lower pixel row and the left pixel row of the sub-group are placed. In one embodiment, the lower pixel row is placed according to Equation 2:

$$f^{-1}(i,1) = \left\{ d_s \;\middle|\; \min_{d_s \in X_i}\{d_s \cdot a_2\} \right\} \forall\, i = 1 \ldots w \quad \text{Equation 2}$$

In one embodiment, the left pixel row is placed according to Equation 3

$$f^{-1}(1,j) = \left\{ d_s \;\middle|\; \min_{d_s \in Y_j}\{d_s \cdot a_1\} \right\} \forall\, i = 1 \ldots h \quad \text{Equation 3}$$

At step 440, the remaining pixels are iteratively placed in the sub-group. In one embodiment, the pixels are placed starting from the lower left of the sub-group and ending at the upper right of the sub-group. In one embodiment, if pixels at positions (i–1, j) and (i, j–1) are already placed, the pixel at position (i, j) is determined according to Equation 4, $$f^{-1}(i,j) = \left\{ d_s \;\middle|\; \min_{d_s \in X_i \cap Y_j}\{d_s \cdot a_1 + d_s \cdot a_2\} \right\} \text{ if } X_i \cap Y_j \neq \varnothing \quad \text{Equation 4}$$

In one embodiment, where the data structures have been placed as described in step 410, the pixel to be placed at position can be determined in O(1) time if $X_i \cap Y_j \neq \emptyset$. If $X_i \cap Y_j = \emptyset$, the partitions $X_i$ and $Y_j$ must be iteratively extended and $d_s \in (X_i \cup X_{i+1}) \cap Y_j$ be considered.

In one embodiment, if this set is still empty, $d_s \in (X_i \cup X_{i+1}) \cap (Y_j \cup Y_{j+1})$ must be considered, and so on, until a data point to be placed is found. It should be appreciated that process 400 is efficient due to the data structure used.

Figure 5:
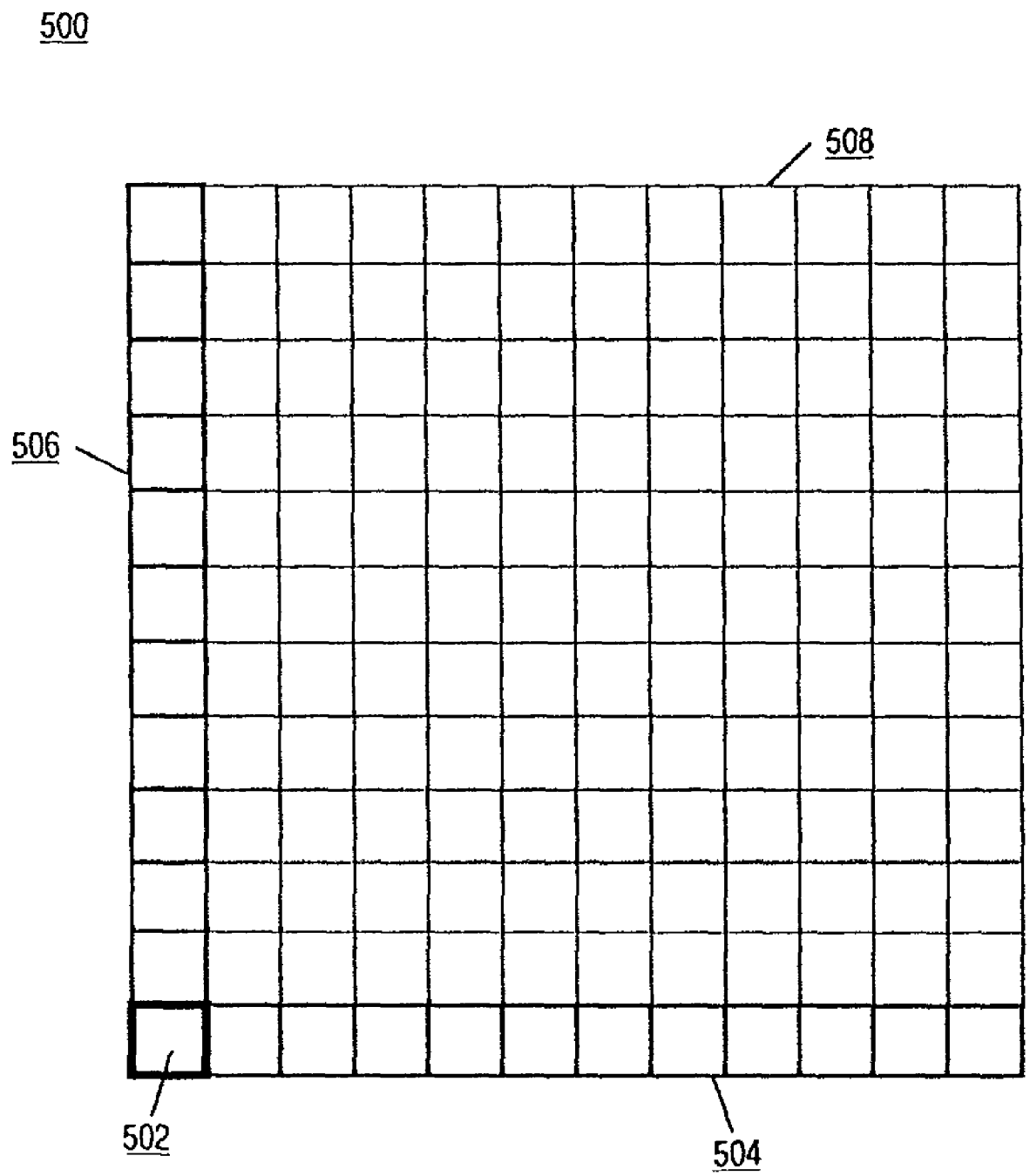
FIG. 5 is an illustration of an exemplary sub-group 500 in accordance with one embodiment of the present invention.

FIG. 5 is an illustration of an exemplary sub-group 500 in accordance with one embodiment of the present invention. It should be appreciated that sub-group 500 may be a group in instances where no second dividing attribute is selected. Sub-group 500 comprises a plurality of pixels. In one embodiment, the plurality of pixels are pixels of a display screen (e.g., a computer monitor).

Lower-left pixel 502 (e.g., position (1,1)) is placed first according to step 420 of process 400 (FIG. 4). Lower pixel row 504 (e.g., position (i,1)) and left pixel row 506 (e.g., position (1,i)) are placed next, according to step 430 of process 400. Remaining pixels 508 (e.g., position (i+1, i+1)) are then placed in sub-group 500, according to step 440 of process 400.

The preferred embodiment of the present invention a method for placement of data for visualization of multidimensional data sets using multiple pixel bar charts, is thus described. While the present invention has been described in particular embodiments, it should be appreciated that the present invention should not be construed as limited by such embodiments, but rather construed according to the below claims.

What is claimed is:

1. A method executed by a computer to form a pixel bar chart for display on a display monitor, comprising:
    obtaining a set of records, each record comprising a plurality of attributes;
    assigning a pixel to each of said records to provide record-assigned pixels, wherein every such record-assigned pixel in the chart is assigned to a different record; and
    constructing the pixel bar chart by:
        partitioning the record-assigned pixels into groups along a first axis of the pixel bar chart according to a first dividing attribute;
        partitioning the record-assigned pixels in the groups into sub-groups along a second axis of the pixel bar chart according to a second dividing attribute;
        after partitioning into the sub-groups, sorting, in each of the sub-groups, the record-assigned pixels according to a first ordering attribute along the first axis of the pixel bar chart, and according to a second ordering attribute along the second axis of the pixel bar chart, wherein each record-assigned pixel is adjacent at least one other record-assigned pixel.

2. The method of claim 1 further comprising, for each record-assigned pixel, assigning a selectable visual indicator to the record-assigned pixel based on an attribute value of each record so that some pixels have a different visual indicator than other pixels.

3. The method of claim 2 wherein the visual indicator comprises color.

4. The method of claim 1 wherein said records are obtained from a multidimensional data set, and said method further comprises assigning a selectable visual indicator to each record-assigned pixel based on an attribute of each record so that some pixels have a different visual indicator than other pixels.

5. The method of claim 1 wherein the pixel bar chart comprises a plurality of columns corresponding to the groups, each column comprising a plurality of pixels and having a width measured in terms of pixels, and the method further comprises causing the width of at least one column to be different than the width of at least one other column.

6. The method of claim 1, wherein sorting the record-assigned pixels in each sub-group according to the first and second ordering attributes comprises performing a two-dimensional sort of the record-assigned pixels in each sub-group.

7. The method of claim 1, further comprising:
    determining a first one-dimensional histogram for the first ordering attribute, and a second one-dimensional histogram for the second ordering attribute,
    wherein sorting the record-assigned pixels in each sub-group is based on the first and second one-dimensional histograms.

8. The method of claim 1, wherein the first and second ordering attributes are selected from the plurality of attributes, and the method further comprising:
    selecting a visual indicator attribute from the plurality of attributes, wherein the visual indicator attribute is different from both the first and second ordering attributes; and
    applying colors to the record-assigned pixels according to the visual indicator attribute such that at least some of the record-assigned pixels have different colors.

9. The method of claim 1, wherein partitioning into sub-groups causes at least some of the sub-groups to have different widths measured in terms of pixels along the first axis, and causes at least some of the sub-groups to have different heights measured in terms of pixels along the second axis.

10. The method of claim 1, wherein sorting the record-assigned pixels in each sub-group according to the first ordering attribute along the first axis comprises sorting the record-assigned pixels in each sub-group according to the first ordering attribute along an x-axis, and
    wherein sorting the record-assigned pixels in each sub-group according to the second ordering attribute along the second axis comprises sorting the record-assigned pixels in each sub-group according to the second ordering attribute along the y-axis.

11. The method of claim 1, wherein constructing the pixel bar chart further comprises arranging the sub-groups in an array defined by the first and second axes.

12. The method of claim 11, wherein partitioning into the sub-groups causes at least some of the sub-groups to have different widths measured in terms of pixels along the first axis, and causes at least some of the sub-groups to have different heights measured in terms of pixels along the second axis.

13. The method of claim 1, wherein the first dividing attribute, second dividing attribute, first ordering attribute, and second ordering attribute are distinct attributes.

14. The method of claim 1, wherein the first dividing attribute, second dividing attribute, first ordering attribute, and second ordering attribute are selected from the plurality of attributes.

15. A computer-readable storage medium having computer-readable program code embodied therein that is adapted to be executed by a computer to implement a method to form a pixel bar chart for display on a display monitor, the method comprising:

obtaining a set of records, each record comprising a plurality of attributes;
assigning a pixel to each of said records to provide record-assigned pixels, wherein every such record-assigned pixel in the chart is assigned a different record; and
constructing the pixel bar chart by:
partitioning the record-assigned pixels into groups along a first axis of the pixel bar chart according to a first dividing attribute;
partitioning the record-assigned pixels in the groups into sub-groups along a second axis of the pixel bar chart according to a second dividing attribute;
after partitioning the record-assigned pixels into the sub-groups, sorting, in each of the sub-groups, the record-assigned pixels according to a first ordering attribute along the first axis, and sorting, within each sub-group, the record-assigned pixels according to a second ordering attribute along a second axis, wherein each record-assigned pixel is adjacent at least one other record-assigned pixel.

16. The computer-readable storage medium of claim 15 wherein said records are obtained from a multidimensional data set, and said method further comprises assigning a selectable visual indicator to each record-assigned pixel based on an attribute of each record so that some pixels have a different visual indicator than other pixels.

17. The computer-readable storage medium of claim 15 wherein the pixel bar chart comprises a plurality of columns that correspond to the groups, each column comprising a plurality of pixels and having a width measured in terms of pixels, and the method further comprises causing the width of at least one column to be different than the width of at least one other column.

18. The computer-readable storage medium of claim 15, wherein sorting the record-assigned pixels according to the first and second ordering attributes along the respective first and second axes comprises performing a two-dimensional sort of the record-assigned pixels according to the first and second ordering attributes.

19. The computer-readable storage medium of claim 15, wherein sorting the record-assigned pixels in each sub-group according to the first ordering attribute along the first axis comprises sorting the record-assigned pixels in each sub-group according to the first ordering attribute along an x-axis, and
wherein sorting the record-assigned pixels in each sub-group according to the second ordering attribute along the second axis comprises sorting the record-assigned pixels in each sub-group according to the second ordering attribute along the y-axis.

20. The computer-readable storage medium of claim 15, wherein the first and second ordering attributes are selected from the plurality of attributes, and the method further comprises:
selecting a visual indicator attribute from the plurality of attributes, wherein the visual indicator attribute is different from both the first and second ordering attributes; and
applying colors to the record-assigned pixels according to the visual indicator attribute such that at least some of the record-assigned pixels have different colors.

21. The computer-readable storage medium of claim 15, wherein partitioning into the sub-groups causes at least some of the sub-groups to have different widths measured in terms of pixels along the first axis, and causes at least some of the sub-groups to have different heights measured in terms of pixels along the second axis.

22. The computer-readable storage medium of claim 15, wherein constructing the pixel bar chart further comprises arranging the sub-groups in an array defined by the first and second axes.

23. The computer-readable storage medium of claim 22, wherein partitioning into the sub-groups causes at least some of the sub-groups to have different widths measured in terms of pixels along the first axis, and causes at least some of the sub-groups to have different heights measured in terms of pixels along the second axis.

24. The computer-readable storage medium of claim 15, wherein the first dividing attribute, second dividing attribute, first ordering attribute, and second ordering attribute are distinct attributes.

25. The computer-readable storage medium of claim 15, wherein the first dividing attribute, second dividing attribute, first ordering attribute, and second ordering attribute are selected from the plurality of attributes.

26. A computer system, comprising:
a bus;
a display device coupled to said bus;
a computer-readable memory coupled to said bus; and
a processor coupled to said bus, said processor executes a method for constructing a pixel bar chart for display on the display device, said method comprising:
obtaining a set of records, each record comprising a plurality of attributes;
assigning a pixel to each of said records to provide record-assigned pixels, wherein every such record-assigned pixel in the chart is assigned a different record; and
constructing the pixel bar chart by:
partitioning the record-assigned pixels into groups along a first axis of the pixel bar chart according to a first dividing attribute;
partitioning the record-assigned pixels in the groups into sub-groups along a second axis of the pixel bar chart according to a second dividing attribute;
after partitioning the record-assigned pixels into the sub-groups, sorting, in each of the sub-groups, the record-assigned pixels according to a first ordering attribute along a first axis, and sorting, within each sub-group, the record-assigned pixels according to a second ordering attribute along a second axis, wherein each record-assigned pixel is adjacent at least one other record-assigned pixel.

27. The computer system of claim 26 wherein said records are obtained from a multidimensional data set, and said method further comprises assigning a selectable visual indicator to each record-assigned pixel based on an attribute of each record so that some pixels have a different visual indicator than other pixels.

28. The computer system of claim 26 wherein the pixel bar chart comprises a plurality of columns corresponding to the groups, each column comprising a plurality of pixels and having a width measured in terms of pixels, and the method further comprises causing the width of at least one column to be different than the width of at least one other column.

29. The computer system of claim 26, wherein at least some of the sub-groups have different widths measured in terms of pixels along the first axis, and at least some of the sub-groups have different heights measured in terms of pixels along the second axis.

30. The computer system of claim 26, wherein sorting the record-assigned pixels according to the first and second ordering attributes causes a two-dimensional sort of the record-assigned pixels in each sub-group.

31. The computer system of claim 26, wherein the first and second ordering attributes are selected from the plurality of attributes, and wherein the method executed by the processor further comprises:

selecting a visual indicator attribute from the plurality of attributes, wherein the visual indicator attribute is different from both the first and second ordering attributes; and applying colors to the record-assigned pixels according to the visual indicator attribute such that at least some of the record-assigned pixels have different colors.

32. The computer system of claim 26, wherein the sub-groups of the pixel bar chart are arranged in an array defined by the first and second axes.

33. The computer system of claim 32, wherein at least some of the sub-groups have different widths measured in terms of pixels along the first axis, and at least some of the sub-groups to have different heights measured in terms of pixels along the second axis.

34. The computer system of claim 26, wherein the first dividing attribute, second dividing attribute, first ordering attribute, and second ordering attribute are distinct attributes.

35. The computer system of claim 26, wherein the first dividing attribute, second dividing attribute, first ordering attribute, and second ordering attribute are selected from the plurality of attributes.

36. A method executed by a computer to form a pixel bar chart for display on a display monitor, comprising:

receiving a set of records, each record comprising a plurality of attributes;

assigning the records to respective data points of the pixel bar chart; and partitioning the data points into groups along a first axis of the pixel bar chart according to a first dividing attribute;

partitioning the data points in the groups into sub-groups along a second axis of the pixel bar chart according to a second dividing attribute, wherein the sub-groups are arranged in an array defined by the first and second axes;

after partitioning into the sub-groups, sorting, in each of the sub-groups, the data points according to a first ordering attribute along the first axis of the pixel bar chart, and according to a second ordering attribute along the second axis of the pixel bar chart.

37. The method of claim 36, wherein partitioning into the sub-groups causes at least some of the sub-groups to have different widths measured in terms of pixels along the first axis, and causes at least some of the sub-groups to have different heights measured in terms of pixels along the second axis.

38. The method of claim 36, wherein the first dividing attribute, second dividing attribute, first ordering attribute, and second ordering attribute are distinct attributes.

39. The method of claim 36, wherein the first dividing attribute, second dividing attribute, first ordering attribute, and second ordering attribute are selected from the plurality of attributes.

* * * * *